(12) United States Patent
Montierth et al.

(10) Patent No.: US 8,630,012 B2
(45) Date of Patent: *Jan. 14, 2014

(54) APPARATUS AND SYSTEM ON A CHIP FOR PRINTING BASED ON PROCESSING OF BASEBAND SIGNALS

(71) Applicant: Marvell World Trade Ltd., St. Michael (BB)

(72) Inventors: Mark D. Montierth, Meridian, ID (US); Gary D. Zimmerman, Garden Valley, ID (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 13/927,735

(22) Filed: Jun. 26, 2013

(65) Prior Publication Data

US 2013/0286437 A1    Oct. 31, 2013

Related U.S. Application Data

(63) Continuation of application No. 13/453,607, filed on Apr. 23, 2012, now Pat. No. 8,477,357, which is a continuation of application No. 11/751,687, filed on May 22, 2007, now Pat. No. 8,164,773.

(60) Provisional application No. 60/808,634, filed on May 26, 2006.

(51) Int. Cl.
*H04N 1/00* (2006.01)
*G06F 15/00* (2006.01)
*G06F 3/12* (2006.01)

(52) U.S. Cl.
USPC ............. 358/1.15; 358/401; 358/1.3; 358/1.6

(58) Field of Classification Search
None
See application file for complete search history.

(56) References Cited

U.S. PATENT DOCUMENTS 6,379,058 B1    4/2002  Petteruti
6,386,772 B1    5/2002  Klinefelter et al.
(Continued)

FOREIGN PATENT DOCUMENTS

JP    2002-043435    2/2002
JP    2002-259089    9/2002
(Continued)

OTHER PUBLICATIONS

Asakura, Hiroshi; Feature Cover Story, Nikkei Microdevices vol. 10, No. 232, Japan, Yosuke Mochizuki, Oct. 1, 2004, No. 232, pp. 32-33 and 38.

(Continued)

*Primary Examiner* — Benny Q Tieu
*Assistant Examiner* — Haris Sabah

(57) ABSTRACT

A system includes a circuit board mounted within a printer. A first chip is mounted on the circuit board. A transceiver includes a receiver that: is implemented in the first chip; wirelessly receives a radio frequency signal; and generates a first baseband signal based on the radio frequency signal. A transmitter of the transceiver is implemented in the first chip and wirelessly transmits, based on a second baseband signal, a second radio frequency signal. A second chip is separate from the first chip and is mounted on the circuit board. The second chip includes first and second processing modules and a processor. The first processing module processed the first and second baseband signals and generates a data signal based on the first baseband signal. The processor generates the second baseband signal based on the first baseband signal. The second processing module implements a printing process based the data signal.

20 Claims, 4 Drawing Sheets

(56) References Cited

U.S. PATENT DOCUMENTS

| | | |
|---|---|---|
| 6,446,192 B1 | 9/2002 | Narasimhan et al. |
| 2002/0124046 A1 | 9/2002 | Fischer et al. |
| 2003/0063773 A1 | 4/2003 | Muramatsu et al. |
| 2004/0046761 A1 | 3/2004 | Hellman et al. |
| 2004/0088594 A1 | 5/2004 | Canagasaby et al. |
| 2005/0157334 A1 | 7/2005 | Silverbrook et al. |
| 2005/0157937 A1 | 7/2005 | Kondo et al. |
| 2005/0179913 A1 | 8/2005 | Fujii |
| 2005/0289290 A1 | 12/2005 | Chen et al. |
| 2006/0092459 A1 | 5/2006 | Kimura et al. |
| 2006/0274715 A1 | 12/2006 | Hahm et al. |
| 2007/0235864 A1 | 10/2007 | Megahed |

FOREIGN PATENT DOCUMENTS

| | | |
|---|---|---|
| JP | 2003-248566 | 5/2003 |
| JP | 2005-124132 | 12/2005 |
| WO | WO 03/003197 | 1/2003 |

OTHER PUBLICATIONS

Translation of Non-Final Notice of Reasons for Rejection in JP Pat. App. No. 2009-512154 dated Sep. 27, 2011.

802.11n; IEEE 802.11-04/0889r6; Wireless LANs, TGn Sync Proposal Technical Specification; May 2005; 131 pages.

IEEE Std 802.11a-1999 (Supplement to IEEE Std 802.11-1999) [Adopted by ISO/IEC and redesignated as ISO/IEC 8802-11: 1999/ AMD 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

IEEE Std 802.11b-1999/Cor Jan. 2001 (Corrigendum to IEEE Std 802.11-1999); IEEE Standard for Information technology—Telecommunications and information exchange between systems—Local and metropolitan area networks—Specific requirements—Part 11: Wireless LAN Medium Access Control (MAC) and Physical Layer (PHY) specifications Amendment 2: Higher-Speed Physical Layer (PHY) extension in the 2.4 GHz Band—Corrigendum 1; LAN/ MAN Standards Committee of the IEEE Computer Society; Nov. 7, 2001; 23 pages.

IEEE P802.11g/D8.2, Apr. 2003 (Supplement to ANSI/IEEE Std 802.11-1999(Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/ MAN Standards Committee of the IEEE Computer Society; 69 pages.

IEEE Std 802.11h—2003 (Amendment to IEEE Std 802.11, 1999 Edition (Reaff 2003)); as amended by IEEE Stds 802.11a-1999, 802.11b-1999, 802.11b-1999/Cor Jan. 2001, 802.11-d2001, and 802. 11g-2003; IEEE Standard for Information technology—Telecommunications and information exchange between systems—Local and metropolitan area networks—Specific requirements—Part 11: Wireless LAN Medium Access Control (MAC) and Physical Layer (PHY) specifications Amendment 5: Spectrum and Transmit Power Management Extensions in the 5 GHz band in Europe; IEEE Computer Society LAN/MAN Standards Committee; Oct. 14, 2003; 74 pages.

IEEE Std 802.16-2004 (Revision of IEEE Std 802.16-2001) IEEE Standard for Local and metropolitan area networks; Part 16: Air Interface for Fixed Broadband Wireless Access Systems; IEEE Computer Society and the IEEE Microwave Theory and Techniquest Society; Oct. 1, 2004; 893 pages.

IEEE 802.20-PD-06, IEEE p. 802.20 V 14, Jul. 16, 2004, Draft 802.20 Permanent Document, System Requirements for IEEE 802.20 Mobile Broadband Wireless Access Systems—Version 14, 23 pages.

Notification of Transmittal of the International Search Report and the Written Opinion of the International Searching Authority, or the Declaration dated Mar. 4, 2008 in reference to PCT/US2007/012402.

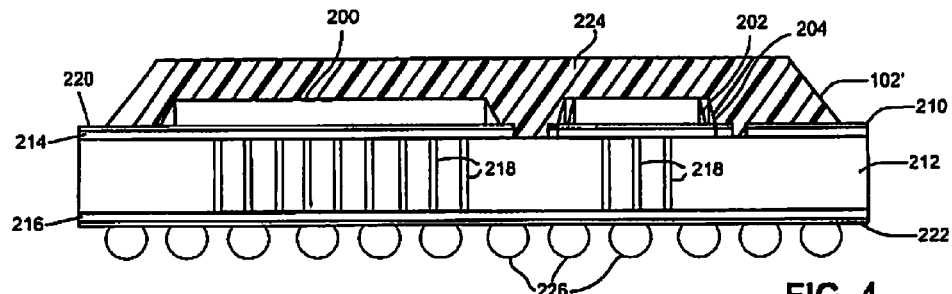
FIG. 4
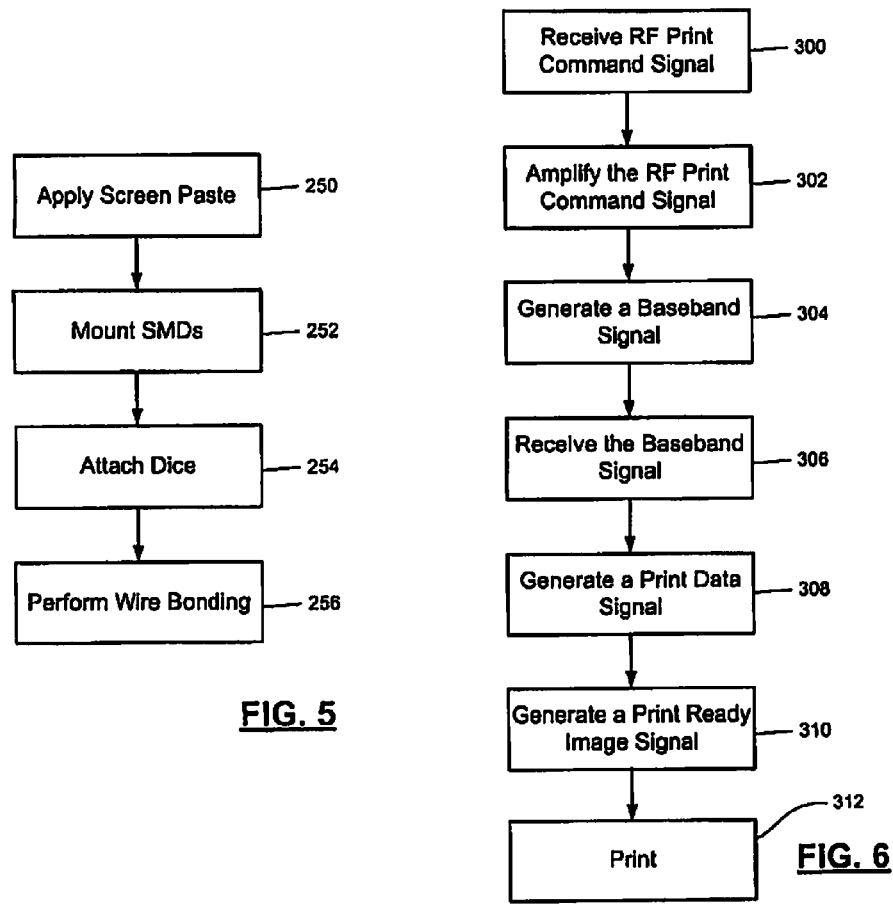
FIG. 5
FIG. 6

APPARATUS AND SYSTEM ON A CHIP FOR PRINTING BASED ON PROCESSING OF BASEBAND SIGNALS

CROSS-REFERENCE TO RELATED APPLICATIONS

This application is a continuation application of U.S. patent application Ser. No. 13/453,607 (now U.S. Pat. No. 8,477,357), filed Apr. 23, 2012 which is a continuation of U.S. patent application Ser. No. 11/751,687 (now U.S. Pat. No. 8,164,773) filed on May 22, 2007. This application claims the benefit of U.S. Provisional Application No. 60/808,634, filed on May 26, 2006. The disclosures of the above applications are incorporated herein by reference in their entirety.

FIELD

The present disclosure relates to wireless printing interfaces, and more particularly to wireless printer architectures.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Wireless printers eliminate the need for printer cables and/or existing wired network connections near a desired printer location. Referring to FIG. 1, a wireless printer architecture 10 for wireless printing is shown. The architecture 10 includes a wireless subsystem 12 that communicates with an imaging subsystem 14 via an interface 16. The wireless subsystem 12 is used in addition to the imaging subsystem 14 to provide wireless communication capability. The imaging subsystem 14 may be similar to a traditional imaging circuit that is used in a printer with a wired communication connection. The interface 16 is coupled between respective input/output interfaces 18, and may include a serial peripheral interface (SPI), a serial peripheral input/output (SPIO), a USB and/or other suitable interface.

The wireless subsystem 12 communicates with and is connected to a radio frequency (RF) transceiver 22 via a communication interface 24. The transceiver 22 transmits and receives RF print command and data signals via an antenna 26 from a print request device, such as a remote computer. The transceiver 22 includes a receiver 27 and a transmitter 28. During receiver operation, an input of a low noise amplifier (LNA) 29 receives signals from the antenna 26, amplifies the signals and outputs them to the receiver 27. During transmitter operation, an output of the transmitter 28 is received by a power amplifier (PA) 30, which outputs amplified signals to the antenna 26. While not shown, the transceiver 22 may also include a frequency synthesizer, a phase locked loop (PLL), and/or a voltage controlled oscillator (VCO).

The wireless subsystem 12 includes a baseband circuit 32 that may be arranged on a first printed circuit board (PCB) 34. The baseband circuit 32 includes baseband hardware 36 and a wireless microprocessor (µP) 38. The baseband circuit 32 communicates with a random access memory (RAM) 40 and a read only memory (ROM) 42. The ROM 42 stores baseband and other wireless interface software 44 that is used in processing received baseband signals.

The imaging subsystem 14 includes an imaging circuit 50 that is arranged on a second PCB 52. The imaging circuit 50 includes imaging hardware 54, an imaging microprocessor 56, a RAM 58 and a ROM 60. The imaging circuit 50 communicates with one or more input/output (I/O) interfaces 62. The ROM 60 stores imaging software 61 that is used to generate print ready output signals. The I/O interfaces 62 may include a network connection 64, a USB connection 66, as shown, or other network and peripheral connections. The imaging circuit 50 is connected to a print mechanism 70, which includes electrical and mechanical elements of a printer that implement a physical print process. Printing output of the print mechanism is based on the print ready output signals. Widespread use of printers with wireless communication capability has not occurred at least partially due to the cost associated therewith.

SUMMARY

A system is provided and includes a first circuit board, a first system on a chip, a wireless transceiver, and a second system on a chip. The first circuit board is configured to be mounted within a printer. The first system on a chip is configured to be mounted on the first circuit board. The wireless transceiver includes a receiver and a transmitter. The receiver is implemented in the first system on a chip. The receiver is configured to (i) wirelessly receive a first radio frequency signal, and (ii) generate a first baseband signal based on the first radio frequency signal. The transmitter is implemented in the first system on a chip. The transmitter is configured to wirelessly transmit, based on a second baseband signal, a second radio frequency signal. The second system on a chip is separate from the first system on a chip. The second system on a chip is configured to be mounted on the first circuit board. The second system on a chip includes a first processing module, a processor, and a second processing module. The first processing module is configured to (i) process the first baseband signal and the second baseband signal, and (ii) generate a data signal based on the first baseband signal. The processor is configured to generate the second baseband signal based on the first baseband signal. The second processing module is configured to implement a printing process based the data signal.

In other features, a first system on a chip is provided and includes a control module configured to: be implemented in a printer; communicate with a print mechanism in the printer; receive a first radio frequency signal transmitted within the printer and from a wireless transceiver to the first system on a chip; and transmit a second radio frequency signal from the first system on a chip to the wireless transceiver. The control module includes a first processing module configured to: receive the first radio frequency signal from the wireless transceiver; generate a first baseband signal based on the first radio frequency signal; based on a second baseband signal, wirelessly transmit the second radio frequency signal using the wireless transceiver; and generate a data signal based on the first baseband signal. The control module further includes a processor and a second processing module. The processor is configured to generate the second baseband signal based on the first baseband signal. The second processing module is configured to print via the print mechanism and based on the data signal.

A system in a package is provided and includes a printed circuit board, a first system on a chip, and a second system on a chip. The printed circuit board is configured to connect to a second circuit board mounted within a printer. The first system on a chip is configured to mount on the printed circuit board. The first system on a chip includes a receiver and a transmitter. The receiver is configured to (i) receive a first radio frequency signal from a low noise amplifier, and (ii) generate a first baseband signal based on the first radio frequency signal. The transmitter is configured to transmit, based on a second baseband signal, a second radio frequency signal to a power amplifier. The receiver, the low noise amplifier, the transmitter, and the power amplifier operate collectively as a wireless transceiver.

The second system on a chip is separate from the first system on a chip. The second system on a chip is configured to mount on the printed circuit board and includes a baseband processing module and an imaging module. The baseband processing module is configured to (i) process the first baseband signal and the second baseband signal, and (ii) generate a data signal based on the first baseband signal. The imaging module is configured to process the data signal to implement physical printing.

In other features, a printer is provided and includes a wireless transceiver in communication with a network device. The network device is separate from the printer. The wireless transceiver includes a low noise amplifier configured to receive a first radio frequency signal from the network device. A receiver is configured to (i) receive the first radio frequency signal from the low noise amplifier, and (ii) generate a first baseband signal based on the first radio frequency signal. A transmitter is configured to generate a second radio frequency signal based on a second baseband signal. A power amplifier is configured to transmit the second radio frequency signal to the network device.

The printer also includes a system in a package. The system in a package includes a printed circuit board, a first system on a chip and a second system on a chip. The first system on a chip is configured to mount on the printed circuit board. The first system on a chip includes the receiver and the transmitter. The second system on a chip separate from the first system on a chip. The second system on a chip is configured to mount on the printed circuit board. The second system on a chip includes a baseband processing module configured to (i) process the first baseband signal and the second baseband signal, and (ii) generate a data signal based on the first baseband signal. The imaging module configured to process the data signal to generate an image signal, wherein physical printing is performed according to the image signal. A print mechanism is configured to (i) receive the image signal, and (ii) perform the physical printing in response to the image signal.

A method is provided and includes operating a system in a package. The method includes receiving, at a receiver, a first radio frequency signal from a low noise amplifier. A first baseband signal is generated based on the first radio frequency signal. Based on a second baseband signal, a second radio frequency signal is transmitted from a transmitter to a power amplifier. The receiver and the transmitter are implemented in a first system on a chip. The first system on a chip is mounted on a printed circuit board. The printed circuit board is configured to connect to a second circuit board mounted within a printer. The receiver, the low noise amplifier, the transmitter, and the power amplifier operate collectively as a wireless transceiver.

The method further includes processing the first baseband signal and the second baseband signal using a baseband processing module. A data signal is generated based on the first baseband signal. The data signal is processed to implement physical printing using an imaging module. The baseband processing module and the imaging module are implemented within a second system on a chip. The second system on a chip is separate from the first system on a chip. The second system on a chip is mounted on the printed circuit board.

In other features, a wireless printer system is provided and includes a wireless transceiver that generates a baseband signal based on a received radio frequency signal. A first system on a chip communicates with the wireless transceiver. The system on a chip includes a wireless interface module and an imaging module. The wireless interface module processes the baseband signal to generate a print data signal via a wireless interface software. The imaging module processes the print data signal to generate a print image signal via an imaging software.

In other features, the first system on a chip includes a central processing unit.

In still other features, the wireless printer system further includes a system in a package that includes the first system on a chip. In other features, the system in a package includes memory that communicates with the wireless interface module and the imaging module. In other features, the memory includes a second system on a chip. In other features, the second system on a chip includes the wireless interface software and the imaging software. In yet other features, the memory includes wireless interface software and imaging software.

In further features, the system in a package includes a memory integrated circuit that stores wireless interface software and printer imaging software and data. In other features, the system in a package includes at least one component of the wireless transceiver. In other features, the system in a package includes at least one component of the wireless transceiver selected from a receiver, a transmitter, a low noise amplifier, and a power amplifier. In other features, the system in a package includes dice. In other features, the dice include a transceiver die and a memory die.

In still other features, the first system on a chip includes a network processing module. In other features, the first system on a chip includes at least one peripheral processing module. In other features, the first system on a chip includes at least one input/output (I/O) processing module.

In yet other features, a printer is provided that includes the wireless printer system and further includes a print mechanism that prints based on the print image signal.

In other features, a method of operating a wireless printer system is provided. The method includes generating a baseband signal based on a received radio frequency signal via a wireless transceiver. The wireless transceiver is communicated with via a system on a chip. The baseband signal is processed to generate a print data signal on the system on a chip using a wireless interface software. The print data signal is processed to generate a print image signal on the system on a chip using imaging software.

In further features, the method includes generating the print data signal and the print image signal via a central processing unit.

In other features, the method includes communicating with the wireless transceiver via a system in a package that includes the system on a chip. In yet other features, the method includes communicating with the wireless interface module and the imaging module via memory that is included in the system in a package. In other features, the method includes communicating with the wireless interface module and the imaging module via the wireless interface software and the imaging software, which are stored in the memory.

In still other features, the method includes generating the print data signal and the print image signal via a printer. Printing is based on the print image signal.

In other features, a wireless printer system is provided that includes wireless transceiving means for generating a baseband signal based on a received radio frequency signal. A first system on a chip for communicating with the wireless transceiving means is included. The first system on a chip includes wireless interface means for processing the baseband signal to generate a print data signal via a wireless interface software. The first system on a chip also includes imaging means for processing the print data signal to generate a print image signal via an imaging software.

In further features, the first system on a chip includes a central processing unit.

In other features, the wireless printer system further includes a system in a package that includes the first system on a chip.

In other features, the system in a package includes storing means for communicating with the wireless interface means and the imaging means. In still other features, the storing means includes a second system on a chip. In other features, the second system on a chip includes the wireless interface software and the imaging software. In other features, the storing means includes wireless interface software and imaging software.

In yet other features, the system in a package includes storing means that stores wireless interface software and printer imaging software and data. In other features, the system in a package includes at least one component of the wireless transceiving means. In other features, the system in a package includes at least one component of the wireless transceiving means selected from a receiver, a transmitter, a low noise amplifier, and a power amplifier. In other features, the system in a package includes dice. In other features, the dice include a transceiver die and a memory die.

In further features, the first system on a chip includes a network processing module. In other features, the first system on a chip includes at least one peripheral processing module. In other features, the first system on a chip includes at least one input/output (I/O) processing module.

In other features, a printer is provided that includes the wireless printer system and further includes a print means for printing based on the print image signal.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4 is a side cross-sectional view of the wireless printer architecture of FIG. 3;

FIG. 5 is a flow diagram illustrating a method of forming a wireless printer architecture according to the present disclosure; and FIG. 6 is a data flow diagram illustrating a method of wirelessly communicating with a printer according to the present disclosure.

DETAILED DESCRIPTION

Figure 1:
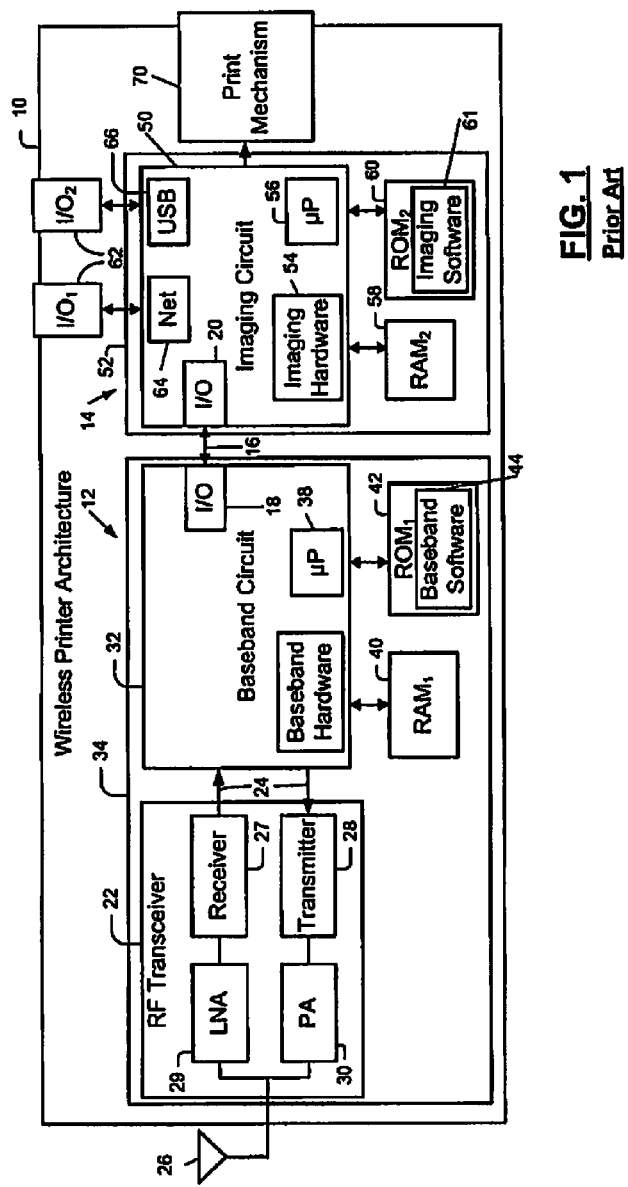
FIG. 1 is a functional block diagram of a wireless printer architecture according to the prior art.

The following description is merely exemplary in nature and is in no way intended to limit the disclosure, its application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Also, in the following description the term "system on chip (SOC)" refers to an integration of multiple components on a single integrated circuit. A SOC may contain digital, analog, mixed-signal, and radio frequency functions on a single chip. For example a processor and a memory may be integrated by a SOC.

As well, in the following description the term "system in a package (SIP)" refers to two or more integrated circuits that are enclosed in a single package or module. An SIP may perform all or most of the functions of an electronic system. An SIP may refer to a combination of one or more wire bonded or flip chip dice with one or more passive components attached to a standard formal microelectronic package. The package forms a functional block or module that may be used as a standard component in board level manufacturing. The integrated circuits or chips may be stacked vertically or placed horizontally alongside one another inside a package.

The use of an SIP and an SOC tends to reduce circuit board cross-sectional area requirements, system cost and overall power consumption. A SIP provides a small footprint with wirebond assembly technology to allow for interconnects between elements and devices. The wirebonds may be encapsulated in a chip-sized ball-grid array (BGA) package. A BGA refers to integrated circuit packages that have output pins in the form of a solder ball matrix. The traces of a BGA are generally fabricated on laminated substrates (BT-based) or polyimide-based films.

In the following description the terms "die" and "dice" refer to a rectangular pattern or patterns on a wafer that contains circuitry to perform a specific function. A die is generally encapsulated to form a chip, which may be placed on a module.

Figure 2:
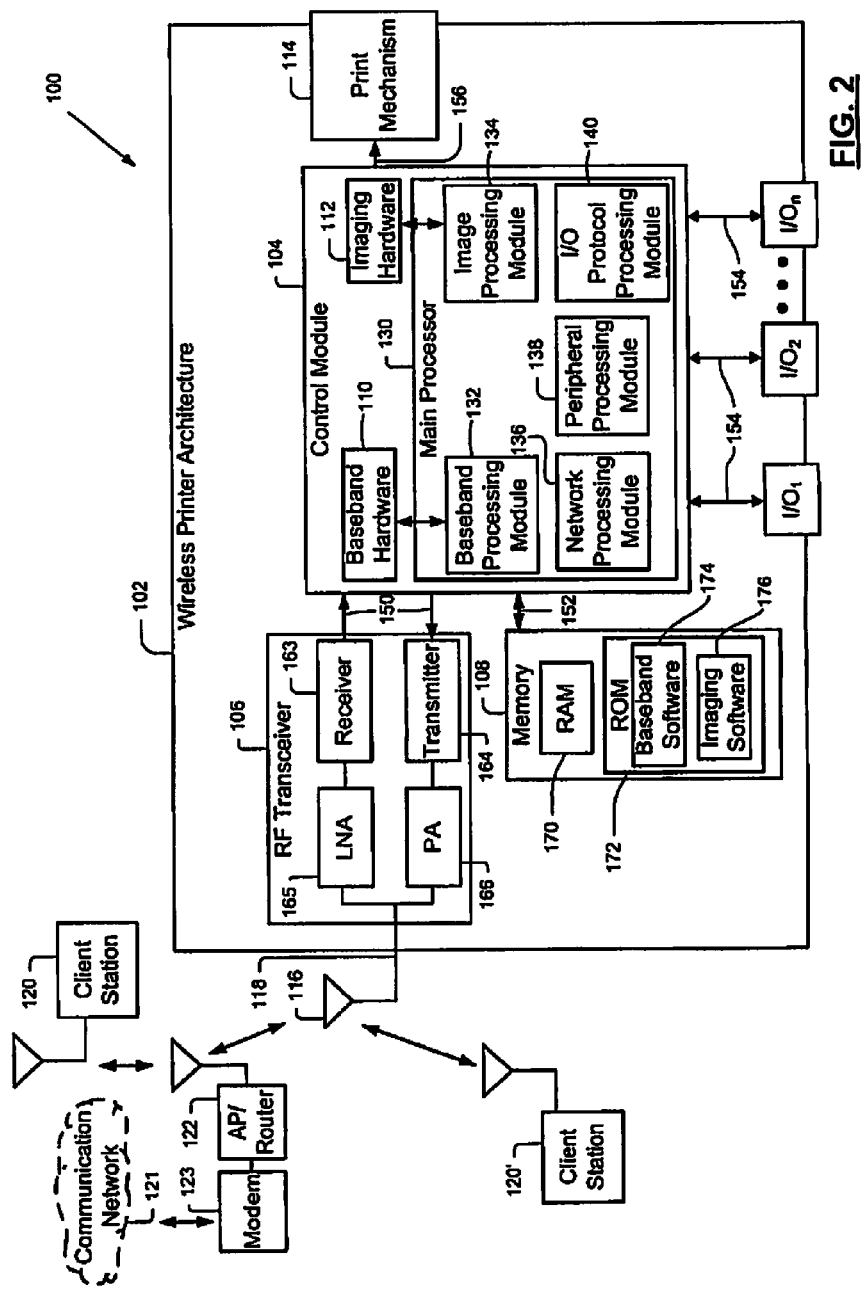
FIG. 2 is a functional block diagram illustrating a wireless printer communication system incorporating a wireless printer architecture according to the present disclosure.

Referring now to FIG. 2, a functional block diagram illustrating a wireless printer communication system 100 is shown. The wireless printer architecture 102 is shown in the form of a printer and thus may be included in a desktop printer, a network printer, a shared printer, etc. The system 100 includes a wireless printer architecture 102 that has a control module 104, a transceiver 106 and a memory 108. The control module is shown in the form of an integrated circuit (IC). The control module 104 includes baseband hardware 110 and imaging hardware 112. The control module 104 is in communication with the transceiver 106 via the baseband hardware 110. The control module 104 is also in communication with a print mechanism 114 via the imaging hardware 112.

In use, the transceiver 106 wirelessly receives radio frequency (RF) print command signals and/or data via an antenna 116 and an antenna interface 118. The print signals may be received from various locations depending upon the mode of operation. For example, when operating in an infrastructure mode the received signals may be received from the client station 120 or another device associated with a communication network 121 via the access point/router 122. The access point/router 122 may communicate with the communication network 121 via a modem 123 and a service provider. When operating in an ad hoc mode, the received signals may be received directly from a client station 120'. The client stations 120, 120' may have central processing units (CPUs). The client station may refer to any print signal transmission device or medium. The client stations 120, 120' and the access point/router 122 may be part of a local area network (LAN), a virtual local area network (VLAN), a wireless local area network (WLAN). The transceiver 106 converts the print signals to a baseband format for reception by the control module 104. The control module 104 controls the operation of the print mechanism 114 based on the baseband signals received. The communication network 121 may be or includes an Internet, an Intranet, or other commercial, instructional or residential communication network. The communication network 121 may, for example, include a wide area network (WAN). Also, and as an example, the stated communication with the printer architecture 102 may be over designated or shared bandwidth. Of course, the communication may include signals other than print command signals and may include transmission to and from the printer architecture 102.

The control module 104 may have a micro signal architecture (MSA) to handle complex, real-time media data flow and control-oriented tasks typically handled by reduced instruction set computing (RISC) processors. Other types of processors may be used as well. The control module 104 may have both digital signal processor (DSP) features and RISC features and support software that can execute video compression, motion compression, and entropy encoding algorithms used for lossless data compression, such as Huffman coding algorithms. The stated algorithms are used by video and image processing standards, such as MPEG2, MPEG4 and JPEG. The control module 104 may support applications with a convergence of capabilities including multi-format audio, video, voice and image processing, multi-mode baseband and packet processing, and real-time security and control processing.

The control module 104 may include various processing modules and communication interfaces, as shown. In one sample implementation, the control module 104 includes a main microprocessor 130, which includes a baseband processing module 132, an image processing module 134, a network processing module 136, a peripheral processing module 138 and an input/output (I/O) protocol processing module 140. The main processor 130 may be a DSP or a microprocessor. The modules 132-140 may be in the form of software or firmware.

The baseband module 132 contains the logic and/or software for wireless communication. The wireless communication may be based on IEEE standards 802.11, 802.11a, 802.11b, 802.11g, 802.11h, 802.11n, 802.16, and 802.20 or the like. The baseband module 132 may be part of a Bluetooth system and have one or more protocol stacks or software subsystems that manage the flow of data according to a particular protocol, such as transmission control protocol/Internet protocol (TCP/IP). The baseband module 132 may support the various Bluetooth profiles, such as standard parallel port (SPP), hardcopy cable replacement profile (HCRP) and object push profiles (OPP). The wireless communication may be directly between the control module 104 and an upstream device, such as the client station 120'. The baseband module 132 manages communication channels and asynchronous and synchronous links. The baseband module 132 also handles packets, paging and inquiries to access any inquire devices in the area.

The image module 134 contains the logic and/or software associated with the carrying out of various imaging and/or printing tasks. The image module 134 may include programming for image printing, viewing and editing. The image module 134 may also process text and other various printing and imaging formats. The image module 134 may be used for storing, managing or extracting information within a document or an image.

The network module 136, the peripheral module 138 and the I/O module 140 include the logic and/or software for wired communication with $I/O_{1-n}$ and any external peripherals and networks connected thereto or in communication with the control module 104. The $I/O_{1-n}$ may be connected to a network, such as one above-stated, a universal serial bus (USB), a Firewire, an Ethernet line, a universal synchronous/asynchronous receiver/transmitter (USART), a serial peripheral interface (SPI) or other communication interface. The peripheral module 138 may also contain logic and/or software to handle internal peripherals, such as counters, timers and generators. The $I/O_{1-n}$ may be in the form of serial ports or parallel ports. The processing modules 132-140 may be separate modules, as shown, or combined into a single module.

The interfaces include a transceiver interface 150, which is controlled by the baseband hardware 110. The interfaces also include a memory interface 152, I/O interfaces 154 and a print mechanism interface 156. The interfaces facilitate communication between the control module 104 and the transceiver 106, the memory 108, the print mechanism 114 and the $I/O_{1-n}$.

The transceiver 106 and the antenna 116 are used for the reception and transmission of radio frequency (RF) signals to and from the client stations 120'. The transceiver 106 includes a receiver 163 and a transmitter 164. During receiver operation, an input of a low noise amplifier (LNA) 165 receives signals from the antenna 116, amplifies the signals and outputs them to the receiver 163. During transmitter operation, an output of the transmitter 164 is received by a power amplifier (PA) 166, which outputs amplified signals to the antenna 116. While not shown, the transceiver 106 may also include a processor and other standard elements and components, such as a frequency synthesizer, a phase locked loop (PLL), and a voltage controlled oscillator (VCO). The transceiver 106 may have mixed signal components, analog and digital components, and may have multiple layers that are associated with various protocols for wireless communication. The stated layers may support WiFi and IEEE standards 802.11, 802.11a, 802.11b, 802.11g, 802.11h, 802.11n, 802.16, and 802.20, as well as other communication protocols, connections and standards.

The memory 108 is used to store programming for the stated modules and communication protocols, as well as to perform the processing tasks associated therewith. The memory 108 may include random access memory (RAM)

170 and read only memory (ROM) 172, as shown, as well as other known memory types. In one implementation, the RAM 170 is used for imaging hardware functionality and the ROM 172 is used to store baseband software 174 and imaging software 176. As another example, the RAM 170 may be discrete known good die (KGD) dynamic or static random access memory.

The baseband hardware 110 may contain logic devices and operates in conjunction with the baseband module 132. Baseband functions are shared by the baseband hardware 110 and the baseband module 132. In general, tasks are divided up based on speed, efficiency, and capability. For example and in general, the baseband hardware 110 is quicker at encryption and decryption than the baseband module 132. As such, the baseband hardware 110 performs the tasks associated with encryption and decryption.

The imaging hardware 112 may contain logic devices and operates in conjunction with the image module 134. Image processing functions are shared by the imaging hardware 112 and the image module 134.

The print mechanism refers to and may include the mechanical and electrical components that perform the printing function. The print mechanism may include print cartridges, rollers, toners, motors, photoreceptors, fusers, lasers, lamps, scanning units, corona wires, print heads, belts, paper feeders, etc.

Figure 3:
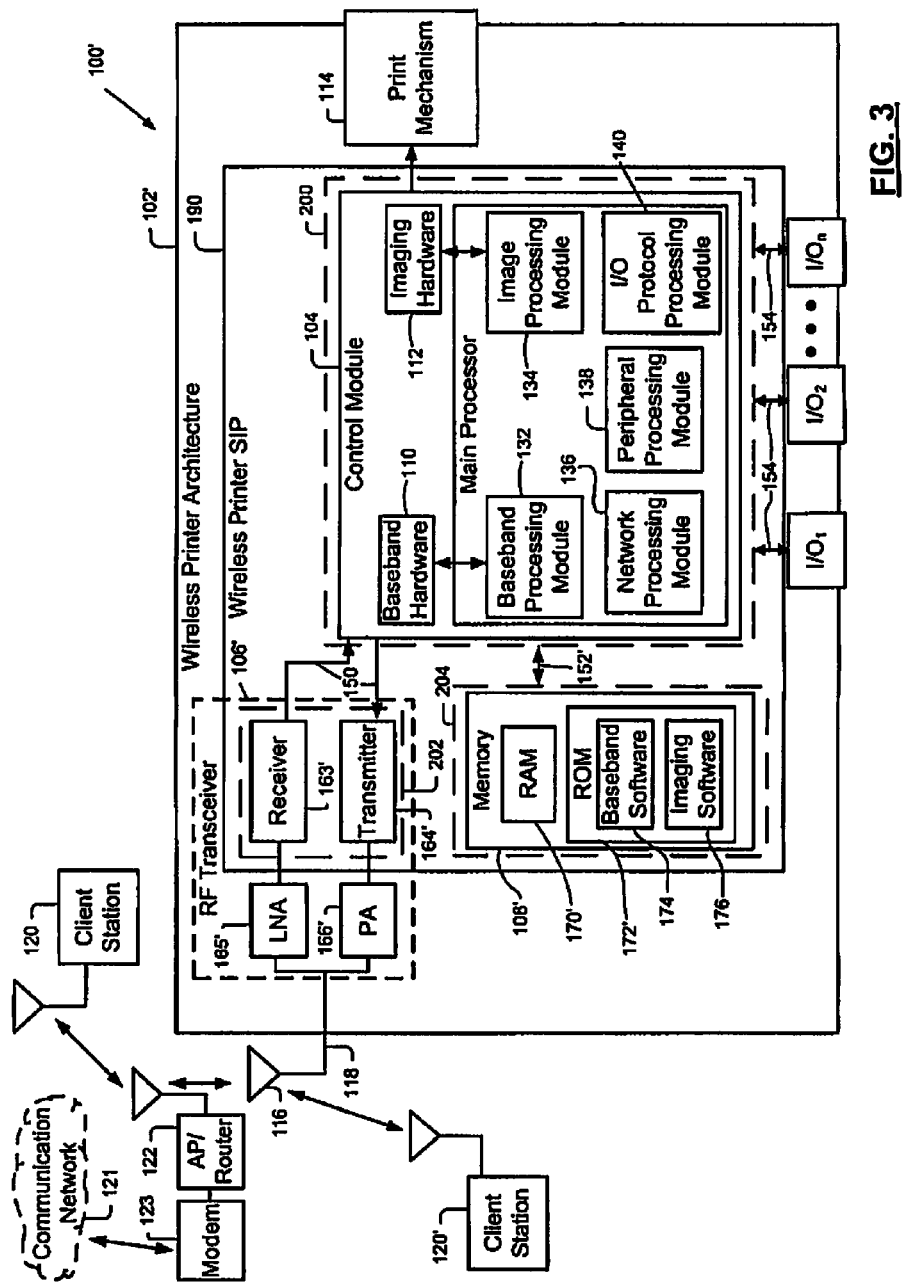
FIG. 3 is functional block diagram illustrating a wireless printer communication system incorporating a wireless printer architecture according to the present disclosure.

Referring to FIG. 3, a functional block diagram illustrating a wireless printer communication system 100' is shown. The printer system 100' is similar to the printer system 100. The printer system 100' includes a wireless printer architecture 102' that has a wireless printer SIP 190, which contains a control module 104', a receiver 163' and a transmitter 164' of a transceiver 106', and a memory 108'. The control module 104', the receiver 163' and a transmitter 164', and the memory 108' may have a control die 200, a transceiver die 202, and a memory die 204, respectively. Note that the LNA 165' and the PA 166', although not shown as such, may also be incorporated in the SIP 190 and the transceiver die 202. The dice 200, 202, 204 are mounted on a microelectronic package, as opposed to being on a PCB or otherwise arranged. The memory 108' includes one or more RAM 170' and one or more ROM 172', which may be on a single chip. The printer architecture 102' may be a stand-alone circuit or package, as shown, or may be incorporated into or used as part of a larger system.

Referring now also to FIG. 4, a sample side cross-sectional view of the wireless printer architecture 102' is shown. The architecture 102' is shown in the form of a single SIP and includes the dice 200, 202, 204, which are mounted on a printed circuit board 210. The printed circuit board 210 has a rigid laminate 212 that is disposed between a top layer 214 and a bottom layer 216. The top layer 214 is in communication with the bottom layer 216 through the use of via 218. The top layer 214 has a first solder mask 220 and the bottom layer 216 has a second solder mask 222. The dice 200, 202, 204 are mounted on the top layer 214. The dice 200, 202, 204 and any surface mounted devices of the SIP are encased in a molded compound or encasement 224. Solder balls 226 are connected to the bottom layer 216 for connection to a circuit board (not shown). Although the architecture 102' is shown as having a single die layer and with multiple SICs, an architecture may be formed to include stacked dice or stacked SICs.

The architectures described above allows for efficient use of processors, memories, and electrical connectors and connections. The architectures minimize idle processor operation time and memory and I/O redundancies. The architectures also allow for increased connectivity rates due to the minimization of the number of components, the elimination of communications between multiple processors and the close proximity of the components used. The architectures also minimize PCB surface area and system complexity.

Referring now to FIG. 5, a process flow diagram illustrating a method of forming a wireless imaging communication architecture is shown. The method describes the formation of a single SIP architecture.

In step 250, screen paste is applied to a printed circuit board (PCB), such as the PCB 210. The screen paste may be applied using a mesh screen stencil printing or a metal stencil printing process. In step 252, surface mount devices (SMDs) are directly mounted on the surface of the PCB. In step 254, the dice 200, 202, 204 are attached to the PCB. The dice 200, 202, 204 may be bonded or glued onto the PCB.

In step 256, a wire bonding process is performed to allow for connection to the dice 200, 202, 204 and other elements of the SIP. Wire may be attached using some combination of heat, pressure, and ultrasonic energy to make a weld.

Referring to FIG. 6, a data flow diagram illustrating a method of wirelessly communicating with a printing device is shown. The method, although primarily described with respect to printing, may be easily modified for other imaging tasks.

In step 300, a transceiver, such as one of the transceivers 106, 106', receives an RF print command signal. The print command signal may be from any print requesting device, such as a computer, a cell phone, a personal data assistant (PDA), etc.

In step 302, the RF signal is amplified. In step 304, the amplified RF signal is converted into a baseband signal. In step 306, a wireless transceiver interface, such as one of the transceiver interfaces 150, 150', receives the baseband signal. In step 308, a wireless communication module or baseband processing module, such as the baseband module 132, processes the baseband signal to generate a print data signal.

In step 310, an imaging module, such as the image module 134, processes the print data signal to generate a print ready image signal. The image processing module performs the appropriate compressing, decompressing, editing, converting, tracking, stabilizing and other image processing tasks to generate the print ready image signal.

In step 312, a print mechanism, such as the print mechanism 114, prints based on the print ready image signal.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A system comprising:
   a first circuit board configured to be mounted within a printer;
   a first system on a first chip configured to be mounted on the first circuit board;
   a wireless transceiver comprising
   a receiver implemented in the first system on the first chip, wherein the receiver is configured to (i) wirelessly receive a first radio frequency signal, and (ii) generate a first baseband signal based on the first radio frequency signal, and a transmitter implemented in the first system on the first chip, wherein the transmitter is configured to wirelessly transmit, based on a second baseband signal, a second radio frequency signal; and a second system on a second chip separate from the first system on the first chip, wherein the second system on the second chip is configured to be mounted on the first circuit board, and wherein the second system on the second chip comprises a first processing module configured to (i) process the first baseband signal and the second baseband signal, and (ii) generate a data signal based on the first baseband signal, a processor configured to generate the second baseband signal based on the first baseband signal, and a second processing module configured to implement a printing process based on the data signal.

2. The system of claim 1, wherein:
the transceiver comprises a low noise amplifier and a power amplifier;
the receiver is configured to receive the first radio frequency signal from the low noise amplifier; and
the transmitter is configured to transmit the second radio frequency signal to the power amplifier.

3. The system of claim 2, wherein:
the first radio frequency signal is transmitted from the low noise amplifier to the system in a package; and
the second radio frequency signal is transmitted from the system in the package to the power amplifier.

4. The system of claim 2, wherein:
the low noise amplifier is configured to receive the first radio frequency signal, via an antenna, from a network device, wherein the network device is separate from the printer; and
the power amplifier is configured to transmit the second radio frequency signal, via the antenna, to the network device.

5. The system of claim 4, further comprising a print mechanism, wherein:
the second processing module is configured to process the data signal to generate an image signal recognizable to the print mechanism, and (ii) transmit the image signal to the print mechanism within the printer; and
the print mechanism is configured to print in response to the image signal.

6. The system of claim 1, wherein:
the first radio frequency signal is transmitted to the printer from a network device that is separate from the printer; and
the second radio frequency signal is transmitted from the printer to the network device.

7. The system of claim 1, wherein:
the first processing module is configured to process, using wireless interface software, each of the first baseband signal and the second baseband signal; and
the second module is configured to process the data signal using imaging software.

8. The system of claim 7, further comprising a third system on a third chip in communication with the second system on the second chip, wherein:
the third system on the third chip comprises memory; and
the memory stores the wireless interface software and the imaging software.

9. The system of claim 1, wherein:
the second processing module is configured to (i) process the data signal to generate an image signal recognizable to a print mechanism, and (ii) transmit the image signal to the print mechanism within the printer; and
the print mechanism is configured to print in response to the image signal.

10. The system of claim 1, wherein the first circuit board is configured to connect to a second circuit board, and wherein the first circuit board comprises:
a first layer, wherein the first system on the first chip and the second system on the second chip are mounted on the first layer;
a second layer configured to connect to the second circuit board by solder balls;
a laminate layer (i) disposed between the first layer and the second layer, and (ii) comprising via, wherein the via are configured to electrically connect the first layer to the second layer; and
an encasement covering the first system on the first chip and the second system on the second chip.

11. The system of claim 10, wherein the first circuit board comprises:
a first solder mask disposed between (i) the first system on the first chip and the second system on the second chip, and (ii) the first layer; and
a second solder mask disposed between the second layer and the solder balls.

12. The system of claim 10, further comprising a third system on a third chip,
wherein:
the third system on the third chip is in communication with the second system on the second chip;
the third system on the third chip is configured to be mounted on the first layer;
the first processing module is configured to process the first baseband signal and the second baseband signal using wireless interface software;
the second processing module is configured to process the data signal using imaging software;
the third system on the third chip comprises memory;
the memory stores the wireless interface software and the imaging software; and
the encasement covers the third system on the third chip.

13. A first system on a first chip comprising:
a control module configured to be implemented in a printer, communicate with a print mechanism in the printer,
receive a first radio frequency signal transmitted within the printer and from a wireless transceiver to the first system on the first chip, and
transmit a second radio frequency signal from the first system on the first chip to the wireless transceiver,
wherein the control module comprises
a first processing module configured to
receive the first radio frequency signal from the wireless transceiver,
generate a first baseband signal based on the first radio frequency signal,
based on a second baseband signal, wirelessly transmit the second radio frequency signal using the wireless transceiver, and
generate a data signal based on the first baseband signal;
a processor configured to generate the second baseband signal based on the first baseband signal; and
a second processing module configured to print via the print mechanism and based on the data signal.

14. The first system on the first chip of claim 13, wherein the control module comprises:
first logic devices configured to
receive the first radio frequency signal from the wireless transceiver, forward the first radio frequency signal to the first processing module,
transmit the second radio frequency signal from the first processing module to the wireless transceiver, and
encrypt or decrypt at least one of the first radio frequency signal and the second radio frequency signal; and
second logic devices configured to (i) receive the data signal from the second processing module, (ii) generate an imaging signal based on the data signal, and (iii) initiate printing via the print mechanism based on the imaging signal.

15. The first system on the first chip of claim 13, wherein:
the first processing module is configured to process the first baseband signal and the second baseband signal using wireless interface software; and
the second processing module is configured to process the data signal using imaging software.

16. A system comprising:
a system in a package comprising
the first system on the first chip of claim 13, wherein the first system on the first chip is configured to generate an image signal based on the data signal,
a second system on a second chip, and
the wireless transceiver in communication with a network device, wherein the network device is separate from printer, and wherein the wireless transceiver comprises
a low noise amplifier configured to receive the first radio frequency signal from the network device,
a receiver implemented in the second system on the second chip, wherein the receiver is configured to (i) receive the first radio frequency signal from the low noise amplifier, and (ii) generate the first baseband signal based on the first radio frequency signal,
a transmitter implemented in the second system on the second chip, wherein the transmitter is configured to generate the second radio frequency signal based on the second baseband signal, and
a power amplifier configured to transmit the second radio frequency signal to the network device; and
the print mechanism configured to (i) receive the image signal, and (ii) print in response to the image signal.

17. The system of claim 16, wherein:
the system in the package comprises a third system on a third chip, wherein the third system on the third chip is in communication with the second system on the second chip;
the first processing module is configured to process the first baseband signal and the second baseband signal using wireless interface software;
the second processing module is configured to process the data signal using imaging software;
the third system on the third chip comprises memory; and
the memory stores the wireless interface software and the imaging software.

18. The system of claim 16, wherein:
the first radio frequency signal is transmitted from the low noise amplifier to the system in the package; and
the second radio frequency signal is transmitted from the system in the package to the power amplifier.

19. The system of claim 16, wherein the system in the package comprises:
a first layer, wherein the first system on the first chip and the second system on the second chip are mounted on the first layer;
a second layer configured to connect to a circuit board by solder balls;
a laminate layer disposed between the first layer and the second layer, wherein the laminate layer comprises via, and wherein the via are configured to electrically connect the first layer to the second layer; and
an encasement covering the first system on the first chip and the second system on the second chip.

20. The system of claim 19, wherein:
the system in the package comprises a third system on a third chip;
the third system on the third chip is in communication with the second system on the second chip;
the third system on the third chip is configured to be mounted on the first layer;
the first processing module is configured to process the first baseband signal and the second baseband signal using wireless interface software;
the second processing module is configured to process the data signal using imaging software;
the third system on a chip comprises memory;
the memory stores the wireless interface software and the imaging software; and
the encasement covers the third system on a chip.

* * * * *